US008482674B2

(12) United States Patent
Jones et al.

(10) Patent No.: US 8,482,674 B2
(45) Date of Patent: Jul. 9, 2013

(54) MULTI-PREVIEW CAPABILITY FOR VIDEO PRODUCTION DEVICE

(76) Inventors: Bret Michael Jones, Smartsville, CA (US); David Alan Casper, Nevada City, CA (US)

(*) Notice: Subject to any disclaimer, the term of this patent is extended or adjusted under 35 U.S.C. 154(b) by 78 days.

(21) Appl. No.: 13/003,868

(22) PCT Filed: Jul. 16, 2008

(86) PCT No.: PCT/US2008/008655
§ 371 (c)(1),
(2), (4) Date: May 4, 2011

(87) PCT Pub. No.: WO2010/008361
PCT Pub. Date: Jan. 21, 2010

(65) Prior Publication Data
US 2011/0205441 A1 Aug. 25, 2011

(51) Int. Cl.
*H04N 5/268* (2006.01)
*H04N 5/222* (2006.01)
*H04N 9/74* (2006.01)

(52) U.S. Cl.
USPC ............................ 348/722; 348/706; 348/588

(58) Field of Classification Search
USPC ................ 348/705, 706, 722, 588, 565, 184, 348/153, 159, 14.07; 345/660, 629; 715/781, 715/792, 800, 798; 340/2.2, 2.27, 2.28
See application file for complete search history.

(56) References Cited

U.S. PATENT DOCUMENTS

| | | | | |
|---|---|---|---|---|
| 3,604,849 A * | 9/1971 | Skrydstrup | ................... | 348/585 |
| 4,698,664 A * | 10/1987 | Nichols et al. | ................ | 348/184 |
| 5,036,395 A * | 7/1991 | Reimers | ......................... | 348/722 |
| 5,166,797 A | 11/1992 | Angell | | |
| 5,189,516 A * | 2/1993 | Angell et al. | ................. | 348/588 |
| 5,325,131 A * | 6/1994 | Penney | ......................... | 348/706 |
| 5,384,912 A * | 1/1995 | Ogrinc et al. | ................. | 345/501 |
| 5,568,204 A * | 10/1996 | Takamori | ...................... | 348/705 |
| 5,684,543 A * | 11/1997 | Kobayashi | .................... | 348/705 |
| 5,943,508 A * | 8/1999 | Penney et al. | ................... | 710/51 |
| 7,024,677 B1 | 4/2006 | Snyder et al. | | |
| 7,818,367 B2 * | 10/2010 | Beasley et al. | ................ | 709/203 |
| 2002/0126226 A1 * | 9/2002 | Dudkowski | .................. | 348/722 |

(Continued)

FOREIGN PATENT DOCUMENTS

| | | |
|---|---|---|
| EP | 0 463 719 A | 1/1992 |
| GB | 2 329 540 A | 3/1999 |
| JP | 04-230792 | 8/1992 |
| JP | 11-164287 | 6/1999 |

OTHER PUBLICATIONS

International Search Report and Written Opinion dated Apr. 7, 2009 for PCT/US2008/008655.
Chinese Office Action for Application No. 200880130691.X dated Nov. 2, 2012 (9 pages).
European Office Action for Application No. 08 794 515.0-2202 dated Nov. 7, 2012 (4 pages).
"The Switcher Redefined", Apr. 30, 2007, XP55042600, URL:http://www.creativevideo.co.uk/pdf/broadcast_pix_slate_brochure.pdf Broadcast Pix Slate(16 pages).
Japanese Office for Application No. 2011-518687, dated Oct. 30, 2012 (2 pages).

*Primary Examiner* — Victor Kostak
(74) *Attorney, Agent, or Firm* — Arent Fox LLP

(57) ABSTRACT

A video production apparatus advantageously includes at least one embedded multi-previewer (14) that receives at least some of a plurality video signals generated by one or more elements in the switcher, such as a mix-effects engine (10). The multi-previewer generates an output signal which when displayed yields of mosaic of images, each representative of a respective input signal. In this way, an operator can observe, via a single video monitor, the status of multiple video signals, thus obviating the need for multiple device outputs, multiple monitors, and associated cabling.

15 Claims, 2 Drawing Sheets

U.S. PATENT DOCUMENTS

| | | | |
|---|---|---|---|
| 2003/0086686 A1* | 5/2003 | Matsui et al. | 386/52 |
| 2003/0117431 A1* | 6/2003 | Moriwake et al. | 345/723 |
| 2003/0189581 A1* | 10/2003 | Nasoff et al. | 345/660 |
| 2003/0214605 A1 | 11/2003 | Snyder et al. | |
| 2006/0039481 A1* | 2/2006 | Shen et al. | 375/240.25 |
| 2006/0212902 A1* | 9/2006 | Seo et al. | 725/39 |

* cited by examiner

FIG. 3   VIDEO PRODUCTION APPARATUS 100

MULTI-PREVIEW CAPABILITY FOR VIDEO PRODUCTION DEVICE

TECHNICAL FIELD

This invention relates to a technique for previewing video generated by a video production apparatus.

BACKGROUND ART

Facilities for producing television programs typically make use of video signals from a variety of sources, such as television cameras, videotape recorders, video servers, satellite feeds, telecine equipment, character generators, and/or slow-motion recording and playback devices, for example. A video switcher (some times referred to as a production switcher or vision mixer) receives video signals from such sources and allows an operator to switch among and/or mix different signals to yield a video output signal of interest to viewers.

A typical video switcher includes one or more mix/effects engines, (M/Es) for processing video signals and associated key signals. Each M/E has receives at least one and preferably a plurality of video signals and key signals supplied via a cross-point matrix. Each key signal serves to composite a video signal. The composite video signals output by the M/Es are typically routed back to the cross-point matrix to provide for layering of video signals.

The M/Es within early generation video switchers provided a single program (PGM) and a single preview (PVW) output. Thus, a video switcher having four M/Es would have eight video outputs. Enabling personnel within a control room to observe the images associated with the program and preview outputs of each of the four M/Es of the video switcher required eight separate video monitors. Currently, some video switcher manufacturers offer M/Es with as many as 4 or 6 outputs and future generations of M/Es will have even more outputs. Thus, conventional methodology would necessitate a large number of monitors to enable monitoring of the M/E output signals. However, a limit exists on the space available in most studio control rooms and mobile trucks for monitors. Additionally, increasing the number of monitors to enable monitoring of the M/E output signals increases costs and operating complexity.

BRIEF SUMMARY OF THE INVENTION

Briefly, in accordance with a preferred embodiment of the present principles, there is provided a video apparatus that includes at least one embedded multi-previewer receives at least some of the plurality of video input signals. The multi-previewer generates an output signal which when displayed yields of mosaic of images, each representative of one of the signals input to the previewer. Internal links carry input signals to the multi-previewer from other elements within the apparatus.

Embedding the multi-previewer within a video apparatus obviates the need for expensive external equipment and complex cabling in order to monitor a plurality of video signals in an apparatus like a video switcher, or within a mix-effects engine of such a switcher. Providing a multi-previewer in such an apparatus offers efficiency and economy by monitoring video directly from input and output streams within the apparatus rather than consume numerous outputs of other external equipment to do the same job.

BRIEF DESCRIPTION OF THE DRAWINGS

FIG. 3 depicts a block schematic diagram of an apparatus in accordance with a second embodiment of the present principles.

DETAILED DESCRIPTION

Figure 1:
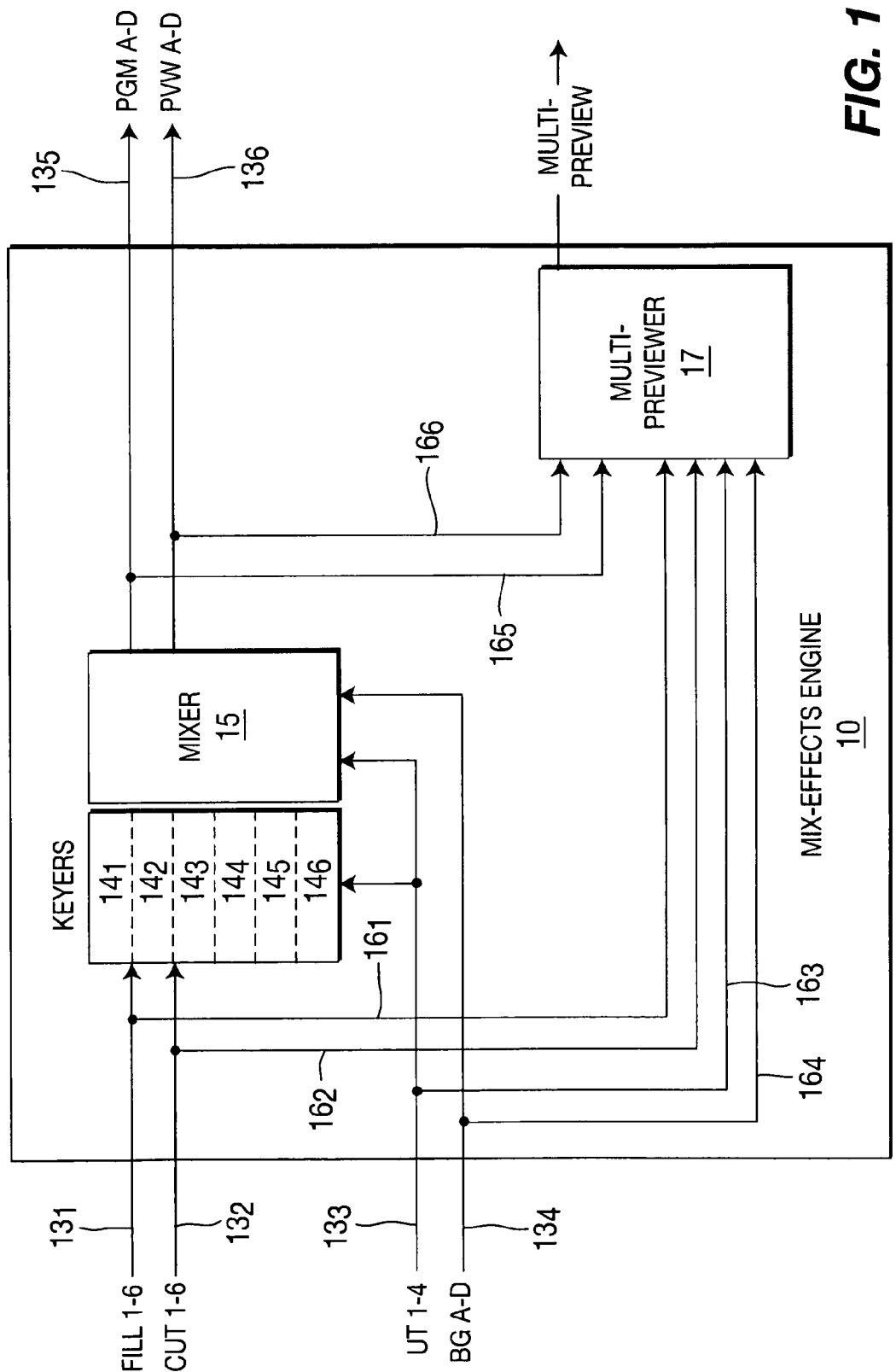
FIG. 1 depicts a block schematic diagram of an apparatus in accordance with a first preferred embodiment of the present principles.

FIG. 1 depicts a block schematic diagram of an apparatus 10 in accordance with a first preferred embodiment of the present principles that combines multiple video input signals into a single output signal, which when displayed, appears as a mosaic of images, each corresponding to a separate one of the input signals. In the embodiment of FIG. 1, the apparatus 10 takes the form of a mix-effect engine for processing video signals. The mix-effects engine 10 of FIG. 1 includes at least one and a preferably a plurality of keyers as are known in the art. A Key is usually made up of two video signals, a Fill and a Cut. The Cut signal is used to shape the Fill signal and cut a hole in the background image for compositing the fill into the hole. In the illustrated embodiment of FIG. 1, the mix-effects engine 10 includes six keyers $14_1$-$14_6$; each supplied with a separate one of Cut signals Cut 1-6 appearing on bus $13_1$ and a separate one of Fill signals Fill 1-6 on bus $13_2$, respectively. Each of the keyers $14_1$-$14_6$ pre-condition the Key Fill and Cut signals at its respective inputs before compositing the Key signals over a background signal within the video Mixer 15 to produce a composite or multiple composite video(s) at output of the Mixer 15.

For purposes of the present principles, the exact structure of the mix-effects engine 10 is not of importance. What is of significance is that the mix-effects engine 10 has multiple inputs signals (e.g., Fill 1-6, Cut 1-6, UT 1-4 and BG A-D) and multiple output signals (PGM A-D and PVW A-D). In the past, monitoring of each video signal appearing on the input and output busses $13_1$-$13_6$ required separate outputs as well as separate video monitors connected by corresponding cables. Thus, the task of monitoring the input and output signals a mix-effects engine becomes difficult. Accordingly, the task of monitoring the input and output signals of multiple mix-effects engines is virtually impossible.

In accordance with the present principles, the mix-effects engine 10 includes an embedded multi-previewer 17 that combines multiple video input signals into a single output signal, which when displayed, appears as mosaic of the images each representative of a corresponding input signal. Each of a plurality of internal links $16_1$-$16_6$ carries at least one and preferably a plurality if not all of the signals on a corresponding one of busses $13_1$-$13_6$, respectively, to a respective one of the inputs of the multi-previewer 17. In this way, the multi-previewer 17 can combine input and output signals associated with the mix-effects engine 10 into a single video signal.

Which images appear in the composite image corresponding to the output signal produced by the multi-previewer 17 of FIG. 1 and the size of the each image will depend on operator commands issued to a controller 18 (not shown). Thus, the multi-previewer 17 can produce a composite image in a variety of different formats (e.g., individual image sizes) for any combination of input signals. In this regard, the multi-previewer 17 can access a wide variety of signals within the mix-effects engine 10 under control of an operator who can readily manipulate the nature of the composite image produced by the multi-previewer. In practice, the output signal of the multi-previewer 17 is coupled to one or more control room monitors (not shown). In addition to, or in place of the control room monitor, the output signal of the multi-previewer can get routed to one or more display devices within one or more video production apparatus (not shown).

Figures 2A, 2B:
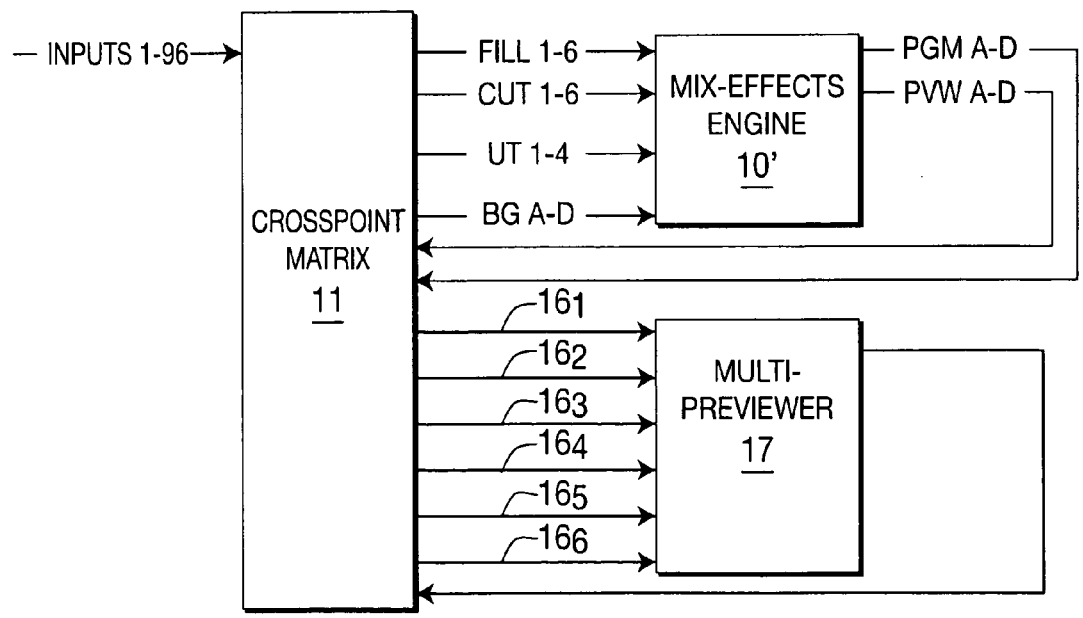
FIGS. 2A and 2B depict two possible image mosaics provided by a multi-previewer within the apparatus of FIG. 1.

FIG. 2A depicts a first exemplary composite image corresponding to the output signal produced by the multi-previewer 17. In FIG. 2A, the composite image corresponding to the output signal produced by the multi-previewer 17 of FIG. 1 includes:

(a) four images Program A-Program D, each representative of a corresponding one of the four signals PGM A-PGM D, respectively, appearing on bus $13_5$;

(b) four images Preview A-Preview, each representative of a corresponding one of the four signals PVW A-PVW D, respectively, appearing on bus $13_6$; and (c) six images Key 1-Key 6, each corresponding to a separate one of the key signals on bus $13_1$, respectively.

As depicted in FIG. 2A, the images Preview A and Program A, corresponding to the signals PGM A and PVW A, respectively, have the same size, which is larger than the size of the images Program B-Program D and Preview B-Preview D, corresponding to the signals PGM B-D and PVW B-D, respectively, the images Key 1-Key 6, representative of the key signals Key 1-Key 6, respectively FIG. 2B illustrates an alternative composite image corresponding to the output signal produced by the multi-previewer 17 of FIG. 1 which includes:

(a) four images Program A-Program D, each representative of a corresponding one of the four signals PGM A-PGM D, respectively, appearing on bus $13_5$;

(b) four images Preview A-Preview D, each representative of a corresponding one of the four signals PVW A-PVW D, respectively, appearing on bus $13_6$; and (c) six images Key 1-Key 6, each corresponding to a separate one of the key signals Key 1-Key 6, on bus $13_1$, respectively.

Embedding the multi-previewer 17 within the mix-effects engine 10 allows the setup and configuration of the multi-previewer to be incorporated into the effects memory function for learn and/or recall purposes. Additionally, the setup and configuration of the multi-previewer 17 can be brought under timeline control (i.e. key-framed) or controlled using switcher macros.

Embedding the multi-previewer 17 within the mix-effects engine 10 of FIG. 1 affords the advantage of monitoring multiple signals without the need for external cabling and without consuming additional resources. In the embodiment of FIG. 1 where the video production apparatus 10 takes the form of mix-effects engine 10, the inputs to the mix-effects engine can be monitored by the multi-previewer 17. Any intermediate signals in the mix-effects engine 10 and any output of the mix-effects engine can be monitored using the multi-previewer 17 as well.

FIG. 3 depicts a block schematic diagram of an apparatus 100 in accordance with a second preferred embodiment of the present principles that combines multiple video input signals into a single output signal, which when displayed, appears as a mosaic of images, each corresponding to a separate one of the input signals. In the embodiment of FIG. 3, the apparatus 100 comprises a video switcher but could also be a video router or other production equipment which includes cross-point matrix 11 that feeds the input signals of the multi-Previewer 17 directly as the primary purpose of the signal. The output of the multi-Previewer could re-enter into the cross-point matrix 11 for further routing and/or go directly to an external monitor. This differs from the embodiment of FIG. 1 in that the multi-Previewer input signals can be any signal internal to the apparatus 100 and do not have to be associated with mix effect engine 10 inputs or outputs.

This arrangement has the additional advantage of being able to show a selection of any group of signals available to the video switcher in addition to showing inputs and outputs of the ME. This arrangement maintains the same advantage as FIG. 1 of obviating the need for external cables but does consume internal resources of switcher matrix connections. So a well constructed system may contain the embodiment of both methods.

Like the multi-previewer 17 of FIG. 1, the multi-previewer 17 of FIG. 3 combines multiple video signals appearing at the multi-previewer inputs into a single output signal, which when displayed, appears as mosaic of the images each representative of a corresponding input signal. Each of plurality of internal links $16_1$-$16_6$ carries at least one and preferably a plurality of the signals directly to a respective one of the inputs of the multi-previewer 17. In this way, the multi-previewer 17 can combine signals appearing on any of the cross-point matrix inputs into a single signal for viewing on a monitor (not shown). Like the multi-previewer 17 of FIG. 1, the multi-previewer 17 of FIG. 3 operates under operator control via a controller 18 (not shown) which can use E-MEMs or MACROs to control the selection of input signals, and hence which images appear in the composite image, as well as their size and location within the composite image.

Unlike the multi-previewer 17 of FIG. 1 which is embedded within the mix-effects engine 10, the multi-previewer 17 of FIG. 3, by virtue of being outboard of the mix-effects engine 10' can combine signals from other elements within the video switcher 100. Although not shown in FIG. 3, the multi-previewer 17 could readily combine the signals from any primary input to the switcher. Additionally, also not shown in FIG. 3. the multi-previewer 17 could readily combine various storage mechanisms embedded within the video switcher 100 such as "still stores", some times referred to as RAM recorders, video stores or image stores. Typically, a still store within a video switcher has at least one and as many as eight inputs and eight output channels. Monitoring the input and output channels of a still store poses a practical problem. To monitor multiple inputs and outputs at the same time requires the use of multiple auxiliary bus outputs on the switcher. If the video switcher lacks sufficient multiple auxiliary bus outputs to permit simultaneous monitoring, then operator must look at each output one at a time by selecting it on the mix effects engine 10' or an auxiliary bus (not shown). The presence of the multi-previewer 17 within the switcher 100 solves this problem because the multi-previewer can combine all of the still store outputs into one composite output signal which can be monitored on single monitor.

Linking the multi-previewer 17 of FIG. 3 to the cross-point matrix 11 of the video switcher 11 affords the ability to make a quad split, octo split, any other type of split on a single switcher output for any primary switcher input or internal signal returned to the matrix (such as mix-effect engine re-entries, still store outputs, embedded digital video effects systems outputs, etc.). Linking the multi-previewer 17 directly to the video switcher's cross point matrix 11 does incur the disadvantage that doing so will consume cross-point matrix destinations (outputs). Video switchers that have a large cross-point matrix likely will possess sufficient excess capacity so as not to cause any difficulties. However, video switchers that do not possess sufficient will require sacrificing an auxiliary output for each input linked to the multi-previewer 17.

The foregoing describes a technique for previewing multiple video in a single image. While the technique has been described in the context of a video switcher, the technique can be readily employed to any type of video production device that has one or more video processing engines that each has one or more input signals or output signals. For example, the technique could be employed in connection with a video production device such as a router comprised of a video production engine that takes the form of a cross-point matrix. (is there a claim for this last point?)

The invention claimed is:

1. Apparatus comprising:
    at least one video processing engine that receives a plurality of input signals and which produces a plurality of output signals;
    at least one embedded multi-previewer within the apparatus for receiving at least some of the plurality of the video processing engine input signals and output signals and for producing an output signal which when displayed yields a mosaic of individual images, the individual images comprising images representative of a respective input signal and output signal; and
    links coupling at least some inputs and the outputs of the at least one video processing engine to the multi-previewer.

2. The apparatus according to claim 1 further comprising a controller for controlling the multi-previewer.

3. The apparatus according to claim 1 wherein the controller controls which individual images appear in the mosaic of images.

4. The apparatus according to claim 3 wherein the controller controls individual image size.

5. The apparatus according to claim 3 wherein the controller controls individual image location within the mosaic of images.

6. The apparatus according to claim 1 wherein the at least one video production engine comprises a mix-effects engine.

7. The apparatus according to claim 6 wherein the multi-previewer is embedded within the mix-effects engine.

8. The apparatus according to claim 6 wherein the mix-effects engine and multi-previewer comprise elements of a video switcher.

9. The apparatus of claim 1, wherein the multi-previewer within the apparatus further receives at least one intermediate signal for the video processing engine, and wherein the mosaic of individual images further includes an individual image representative of the intermediate signal.

10. A method, comprising:
    selecting from among a plurality of video signals in a video production apparatus, a subset of signals for monitoring; and
    combining the subset of signals into a single signal which when displayed appears as a mosaic of individual images, each representative of a respective one of the subset of signals wherein the subset of signals comprises at least one input signal for the video production apparatus and at least one output signal for the video production apparatus.

11. The method according to claim 10 wherein the selected subset comprises less than the plurality of video signals.

12. The method according to claim 10 wherein the selected subset comprises all of the plurality of video signals.

13. The method according to claim 10 further comprising adjusting individual image size.

14. The method apparatus according to claim 10 further comprising the step of adjusting individual image location.

15. The method of claim 10, wherein the combined subset of signals further comprises at least one intermediate signal for the video production apparatus.

* * * * *